(12) United States Patent
Roques et al.

(10) Patent No.: US 7,568,659 B2
(45) Date of Patent: Aug. 4, 2009

(54) DOOR WHICH IS INTENDED TO BE POSITIONED BETWEEN THE COCKPIT AND THE CABIN OF AN AIRCRAFT

(75) Inventors: Serge Roques, Cornebarrieu (FR); Olivier Pujol, Beauzelle (FR); Dominique Prost, Lyons (FR); Philippe Malaval, Lyons (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/538,446

(22) PCT Filed: Dec. 4, 2003

(86) PCT No.: PCT/FR03/50153

§ 371 (c)(1),
(2), (4) Date: Jun. 10, 2005

(87) PCT Pub. No.: WO2004/054874

PCT Pub. Date: Jul. 1, 2004

(65) Prior Publication Data

US 2006/0048449 A1 Mar. 9, 2006

(30) Foreign Application Priority Data

Dec. 9, 2002 (FR) .................................. 02 15526

(51) Int. Cl.
*B64D 11/00* (2006.01)
*B64C 1/14* (2006.01)
(52) U.S. Cl. .................. 244/121; 49/31; 49/56; 49/62

(58) Field of Classification Search ................. 244/121, 244/129.4, 129.5; 49/31, 56, 57, 371, 62
See application file for complete search history.

(56) References Cited

U.S. PATENT DOCUMENTS

| | | | | |
|---|---|---|---|---|
| 2,763,900 | A * | 9/1956 | McAfee et al. | 49/70 |
| 4,042,193 | A * | 8/1977 | Cerne | 244/129.1 |
| 4,383,666 | A | 5/1983 | Allerding et al. | |
| 6,484,449 | B1 | 11/2002 | Artsiely | |
| 6,702,230 | B2 * | 3/2004 | Movsesian et al. | 244/118.5 |
| 2003/0052227 | A1 | 3/2003 | Pittman | |

FOREIGN PATENT DOCUMENTS

| | | |
|---|---|---|
| FR | 2 478 572 | 11/1981 |
| WO | 03/029591 | 4/2003 |

\* cited by examiner

*Primary Examiner*—Rob Swiatek
(74) *Attorney, Agent, or Firm*—Nixon Peabody LLP (57) ABSTRACT

The invention relates to a door (8) designed to be inserted between a cockpit and a cabin of an aircraft, the door comprising a cockpit side (8a) and a cabin side (8b). According to the invention, the door comprises at least one trapdoor (22) capable of closing off a passageway (20) passing through the door and secondly being opened towards the cabin side, the door also comprising a locking/unlocking mechanism (30) of the trapdoor arranged on the cockpit side and that can automatically unlock the trapdoor when the difference between a cockpit pressure and a cabin pressure corresponding to the air pressures applied on the cockpit side and the cabin side of the door respectively is greater than a predetermined value.

21 Claims, 5 Drawing Sheets

DOOR WHICH IS INTENDED TO BE POSITIONED BETWEEN THE COCKPIT AND THE CABIN OF AN AIRCRAFT

CROSS-REFERENCE TO RELATED APPLICATION

This application claims priority to France Application No. 02 15526, filed on Dec. 9, 2002, entitled: "Door Designed to be Inserted Between an Aircraft Cockpit and Cabin" by Serge Roques, Oliver Pujol, Dominique Prost and Philippe Mallaval and was not published in English.

TECHNICAL DOMAIN

This invention relates to a door designed to be inserted between a cockpit and a cabin of an aircraft, and a door system composed of such a door and an associated doorframe.

STATE OF PRIOR ART

In this technical domain, a conventional door is known that separates the cockpit and the cabin of an aircraft, this door normally being relatively simple in design and comprising a cockpit side facing the cockpit and a cabin side facing the cabin of the aircraft when the door is in the closed position.

Typically, the door is mounted on a doorframe so that the door can be opened indifferently towards the cockpit side or the cabin side. In this way, when depressurisation occurs in the cockpit of the aircraft the door can be opened towards the cockpit, and when depressurisation occurs in the cabin of the aircraft the door can be opened towards the cabin, to create venting between these two compartments. Furthermore, note that the fact that the door can be opened in two different ways usually creates a gap between the door and its associated doorframe.

Several measures have been envisaged to reinforce the door system inserted between the cockpit and the cabin to face insecurity and terrorism threats onboard aircraft, and particularly in order to protect flight personnel located in the cockpit.

These measures include particularly elimination of the gap existing between the door and its associated doorframe in order to prevent bullets from being fired from the cabin towards the cockpit of the aircraft through the gap. Note also for guidance that other measures have been proposed such as measures intended to reinforce the door structure and its associated doorframe to make these elements fully resistant to impacts of bullets and intrusion, or to lock the door in its associated doorframe throughout the entire duration of the aircraft flight.

In this respect, note that one simple way of eliminating the initial gap between the door and its associated doorframe consists of designing the doorframe so that it partially covers one of the two sides of the door. In this case, the cabin side is preferably chosen particularly so that the hinges located between this door and the door frame are not accessible from the aircraft cabin, also for security reasons.

However in this configuration, the doorframe is such that the door can only be opened on the cockpit side. Consequently, when depressurisation occurs in the aircraft cabin, the door cannot open towards the cabin side and thus prevents an airflow from passing between the cockpit and the cabin through the doorframe.

Furthermore, even if the venting areas can be provided between the cockpit and the cabin to achieve permanent venting between these two compartments of the aircraft, the restricted number of spaces available in the cockpit to accommodate these venting areas is not sufficient for satisfactory venting satisfying regulatory requirements related to aircraft cabin depressurisation cases.

Apart from respecting regulatory requirements, note that insufficient venting between this cockpit and the cabin can easily make it impossible to open this door and therefore blocking flight personnel inside the cockpit due to the difference in air pressure on each side of the door. Finally, note that a higher difference in the air pressure can also cause severe equipment damage that could cause loss of the aircraft and/or injury to occupants of this aircraft.

OBJECTS OF THE INVENTION

Therefore, the purpose of the invention is to propose a door that will be inserted between a cockpit and a cabin of an aircraft, the door at least partially correcting the disadvantages mentioned above related to embodiments according to prior art.

More precisely, the purpose of the invention is to present a door with a design compatible with the measures mentioned above in order to increase the security of flight personnel located in the cockpit, while being capable of handling depressurisation occurring inside the aircraft, and more specifically depressurisation occurring inside the cabin of this aircraft.

Furthermore, the purpose of the invention is to propose a door system that will be inserted between a cockpit and a cabin of an aircraft, the system comprising a doorframe and a door like that satisfying the purposes mentioned above.

To achieve this, the first object of the invention is a door designed to be inserted between a cockpit and a cabin of an aircraft, the door being provided with a cockpit side and a cabin side and comprising at least one trapdoor that can firstly close off a passageway passing through the door and secondly being opened towards the cabin side of this door. The door also comprises a locking/unlocking mechanism of the trapdoor arranged on the cockpit side of this door and that can automatically unlock the trapdoor when the difference between a cockpit pressure and a cabin pressure corresponding to the air pressures applied on the cockpit side and the cabin side respectively of the door is greater than a predetermined value.

Advantageously, the design of the door according to the invention is adapted to handle depressurisation occurring inside the aircraft, and more specifically depressurisation that occurs in the cabin of this aircraft, even when this door is mounted on an associated doorframe so that it opens only towards the cockpit side. The planned trapdoor in the door can be automatically unlocked when the difference, in air pressure applied on each side of the door is greater than a predetermined value, this predetermined value could advantageously correspond to a value representing a significant depressurisation in the aircraft cabin.

Once unlocked, the trapdoor opens towards the cabin side of the door to open the passageway passing through this door, and consequently to set up an airflow between the cockpit and- the cabin of the aircraft.

In this way, the door according to the invention can provide venting fully satisfying regulatory requirements related to depressurisation-cases of the aircraft cabin, while being compatible with measures mentioned above to increase the security of flight personnel located in the cockpit, particularly related to elimination of the gap between the door and its associated doorframe, that could make it impossible to open this door towards the cabin side.

Note for guidance that in the non-limitative case in which the door according to the invention will be mounted on an associated doorframe so that it can open only towards the cockpit side, the regulatory requirements related to depressurisation cases occurring in the aircraft cockpit can easily be satisfied, with this door being able to open towards the cockpit side.

Thus, with such a door according to the invention, the risks of losing the aircraft and/or the occupants of this aircraft being injured are advantageously very much reduced.

Furthermore, as mentioned above, when the difference in air pressure applied on each side of the door is greater than the predetermined value, in other words when the difference between the pressure inside the cockpit and the pressure inside the cabin of the aircraft is greater than this value, the trapdoor that can close off the passageway through the door is automatically unlocked. In this respect, it could preferably be arranged that this predetermined value is such that it can generate a sufficient force on the trapdoor to cause automatic opening of the unlocked trapdoor towards the cabin side. In other words, the unlocked trapdoor can be automatically opened under the effect of a force directly resulting from the pressure difference applied on each side of the trapdoor.

Obviously, alternate solutions could be envisaged to open the unlocked trapdoor. In this respect, a conventional spring mechanism could be used of the type held in tension when the trapdoor is locked in a passageway closed position, and that can release its energy as soon as the trapdoor is unlocked to cause sudden opening of this trapdoor towards the cabin side. Secondly, it is naturally possible to open the unlocked trapdoor manually from the inside of the cockpit of the aircraft.

According to one preferred embodiment, the locking/unlocking mechanism of the trapdoor is mounted on the trapdoor in the door. In this way, the trapdoor and its locking/unlocking mechanism can be made together, independently of the rest of the door, composed of a main door body in which a through passageway is formed. However, it could also be possible to mount the locking/unlocking mechanism on the main body of the door without going outside the scope of the invention.

Note also that several locking/unlocking mechanisms may be used to equip the trapdoor in the door, provided that they are capable of firstly performing the trapdoor locking function, namely that they are capable of holding this trapdoor in position on the door using a bolt, and secondly the automatic unlocking function of this trapdoor when the difference between the air pressure applied on the cockpit side and the air pressure applied on the cabin side is greater than the predetermined value.

Among the envisaged mechanisms, we will start by mentioning a locking/unlocking mechanism provided firstly with measurement means capable of measuring air pressures applied on each side of the door, and secondly control means connected to the measurement means, capable of outputting a signal causing each bolt to be opened when the predetermined value of the difference in air pressure is exceeded. However, it can be noted that this type of mechanism requires a large number of electrical means and connections. In this way this type of locking/unlocking mechanism is subject to a non-negligible risk of failure that can be very serious considering the potential disastrous consequences if the trapdoor in the door fails to unlock, when depressurisation occurs in the aircraft cabin.

The locking/unlocking mechanism designed to be coupled to the trapdoor in the door may preferably be of the pneumatic mechanism type, without any component necessitating an electrical power supply, to overcome the risk of an electrical failure mentioned above. Such a pneumatic mechanism is designed so as to automatically unlock the trapdoor under the effect of a simple force generated by the difference in air pressure applied on each side of the door.

To achieve this, the trapdoor locking/unlocking mechanism can then include:
- a secondary trapdoor comprising a first surface and a second surface, the first surface being subject to the cockpit pressure,
- a membrane defining a chamber and being provided with a first end and a second end, the first end being fixed to the second surface of the secondary trapdoor, and the second end being fixed to a portion of the trapdoor provided with at least one through orifice, such that at least a part of the second surface of the secondary trapdoor is subjected to cabin pressure, and
- means of transmission of movement connected firstly to the secondary trapdoor that can be moved when the cockpit pressure and the cabin pressure are different, and secondly to at least one bolt that will cooperate with a trapdoor frame provided on the door and defining the passageway.

With this arrangement, the secondary trapdoor may be moved and this movement may be transmitted as far as one or several bolts holding the trapdoor in a locked position closing the passageway, as a function of the different pressures applied on the opposite surfaces of the secondary trapdoor, such that this or these bolts release the trapdoor frame and then allow the trapdoor to open.

Preferably, the secondary trapdoor comprises an upper end and a lower end, the lower end being connected hinged onto the trapdoor and the upper end being connected hinged to the movement transmission means. In this configuration, when the cockpit pressure becomes greater than the cabin pressure, the secondary trapdoor can pivot about its lower end.

It would be possible for the movement transmission means for each bolt in the locking/unlocking mechanism to include:
- a connecting rod, provided with a first end and a second end, the first end being connected hinged to the upper end of the secondary trapdoor, and
- a sliding transmission rod provided with a first end and a second end, the first end being connected hinged to the second end of the connecting rod, and the second end being connected fixed to the bolt. Thus, when a pivoting movement of the secondary trapdoor causing a difference between the cockpit pressure and the cabin pressure, this movement is transformed by simple and inexpensive means into sliding of the bolt in the locking/unlocking mechanism.

In this respect, note that for each bolt in the locking/unlocking mechanism, the movement transmission means can also comprise a guide bushing fixed to the trapdoor in the door, inside which the transmission rod is free to slide.

Preferably, each bolt in the locking/unlocking mechanism is fixed to a lever that can be actuated in order to release the trapdoor manually, a bolt return spring being arranged between the lever and the guide bushing of the movement transmission means.

The possibility of unlocking and then easily and manually opening the trapdoor from the inside of the aircraft cockpit makes it possible to evacuate flight personnel located in this cockpit, for example following an accident that caused blockage of the door in a closed position. Naturally, note that the door passageway is large enough so that personnel can be evacuated through the passageway.

Even if the trapdoor locking/unlocking mechanism is arranged on the cockpit side of the door and is therefore inaccessible to the occupants of the aircraft cabin, it is possible that persons such as terrorists who would like to enter into the aircraft cockpit illegally could fire bullets or could project a mass onto the door inserted between the cockpit and the cabin, and particularly onto the trapdoor itself. These actions that could be carried out from the aircraft cabin could cause unlocking of the trapdoor, for example by movement of the secondary trapdoor occurring following an acceleration generated by the impact of bullets or the mass in contact with this door, rather than a pressure difference on each side of the door.

To deal with this problem that could make it possible for terrorists to enter the aircraft cockpit, flight personnel located in this cockpit have the ability to hold the lever(s) in position in order to manually block the associated bolt(s) in a locked position, and thus prevent unlocking and opening of the trapdoor. Furthermore, in this case, an appropriate design of the locking/unlocking mechanism could also make it possible for flight personnel to pivot the lever(s) so that they are blocked in translation with respect to the trapdoor, and consequently prevent any sliding of the bolts to which they are attached.

Nevertheless, it is also possible to add means of reducing the risks of the trapdoor becoming unlocked following the impact of bullets or a mass in contact with the door, and not requiring any action by personnel located inside the cockpit.

In this respect, the movement transmission means for each bolt in the locking/unlocking mechanism may include anti-acceleration means designed to stop the movement of the transmission rod when the transmission rod is moving at a speed greater than a predetermined speed, and therefore to stop movement of the set of elements in the locking/unlocking mechanism. Obviously, these anti-acceleration means causing blockage of the transmission rod can easily be overridden when the lever(s) are actuated manually from inside the cockpit. Furthermore, the anti-acceleration means remain inoperative when the transmission rod is animated by a relatively slow movement, with a speed less than the predetermined speed, like that encountered during a depressurisation of the aircraft cabin or during severe in-flight turbulence.

Furthermore, an alternate solution to that mentioned above that can also reduce risks of the trapdoor being unlocked following the impact of bullets or a mass in contact with the door, consists of planning that the movement transmission means for each bolt in the locking/unlocking mechanism also comprise stop means provided with an inertial mass that can move automatically from a withdrawn position to a stop position, following a shock that occurs on the door with an intensity greater than or equal to a predetermined intensity, so as to form a stop for a stop device fixed to the bolt.

With this arrangement, blocking the stop device simultaneously blocks the bolt in position, such that the trapdoor cannot be unlocked.

In this respect, note that the stop means remain inoperative as long as the acceleration applied onto the inertial mass is less than the acceleration caused by a shock with an intensity equal to the predetermined intensity, this acceleration particularly being likely to occur during severe in-flight turbulence.

Still with the same purpose, it would also be possible for the locking/unlocking mechanism to include a balancing system for the secondary trapdoor, the balancing system being designed to prevent any movement of the secondary trapdoor that could cause unlocking of this trapdoor following a shock applied on the door and more specifically to the trapdoor of this door. Naturally, the balancing device is designed so that it can balance the driving moment applied by the secondary trapdoor under the acceleration caused by the shock applied on the door.

Preferably, the locking/unlocking mechanism is protected by a protection cover installed on the cockpit side on the trapdoor in the door, and that does not oppose equilibrium of pressures, this cover for example being in the form of a grill. With this arrangement, all the elements in the locking/unlocking mechanism are protected from any shocks that might occur during maintenance operations, or during access of flight personnel into the cockpit. Obviously, the lever(s) is (are) arranged so as to project from this protection cover, such that personnel can easily access it (them).

Furthermore, the portion of the trapdoor provided with at least one through orifice is covered by a filter arranged on the cabin side of the door and concealing the location of each orifice, the filter being held in contact with the trapdoor by a bullet-proof protection grill assembled on the trapdoor. In this way, persons inside the aircraft cabin cannot see the orifice(s) formed. Furthermore, note that the planned filter advantageously prevents these orifices from being clogged by dust, since clogging of one or several of these orifices could cause a malfunction in the trapdoor locking/unlocking mechanism.

Furthermore, also in order to increase the security of flight personnel located in the aircraft cockpit, the bullet-proof protection grill is assembled on the trapdoor using a plurality of studs passing through the trapdoor, and that can only be disassembled from the cockpit side of the door.

Preferably, the trapdoor comprises a lower part provided with pivot hooks designed firstly to hold the trapdoor in a passageway closing position when it locked, and secondly to enable pivoting of the trapdoor towards the cabin side when it is unlocked.

Secondly, the trapdoor may comprise an upper part provided with trapdoor retaining means in the passageway, these retaining means preferably being composed of at least one ball pusher capable of cooperating with the trapdoor frame fixed in the door. In this respect, note that these retaining means can prevent the trapdoor from tipping when the locking/unlocking mechanism is actuated inadvertently, rather than following a difference in air pressure that caused automatic unlocking of the trapdoor. Thus, with the addition of such means, it is then necessary to apply a given threshold force to cause opening of the unlocked trapdoor. Note that this force threshold is naturally determined so that it will be less than any force applied on the trapdoor and its associated locking/unlocking mechanism caused by a pressure difference that led to automatic unlocking of the trapdoor. In this way, even when these retaining means are installed between the trapdoor frame and the trapdoor, as soon as the trapdoor is unlocked, it will be automatically opened towards the cabin side of the aircraft.

As mentioned above, the door preferably comprises a main door body and a trapdoor that can be mounted on the main door body in order to close off the passageway, the trapdoor fitted with the locking/unlocking, mechanism being fully removable from the main door body. Advantageously, assembly and disassembly operations of the trapdoor fitted with its associated locking/unlocking mechanism can be made quickly without any tools.

The main body of the door and the trapdoor may be made from a bullet-proof material, to provide a door with even greater security for flight personnel.

Another object of this invention is a door system to be inserted between a cockpit and a cabin of an aircraft, the system comprising a doorframe and a door with a cockpit side and a cabin side, the doorframe being capable of partially covering the cabin side of the door preventing this door from being opened in any direction except towards the cockpit side.

According to the invention, the door is like the door within the scope of the invention and described above.

Other advantages and characteristics of the invention will become clear from the detailed non-limitative description given below.

BRIEF DESCRIPTION OF THE DRAWINGS

This description will be given with reference to the attached drawings among which.

DETAILED DESCRIPTION OF A PREFERRED EMBODIMENT

Figure 1:
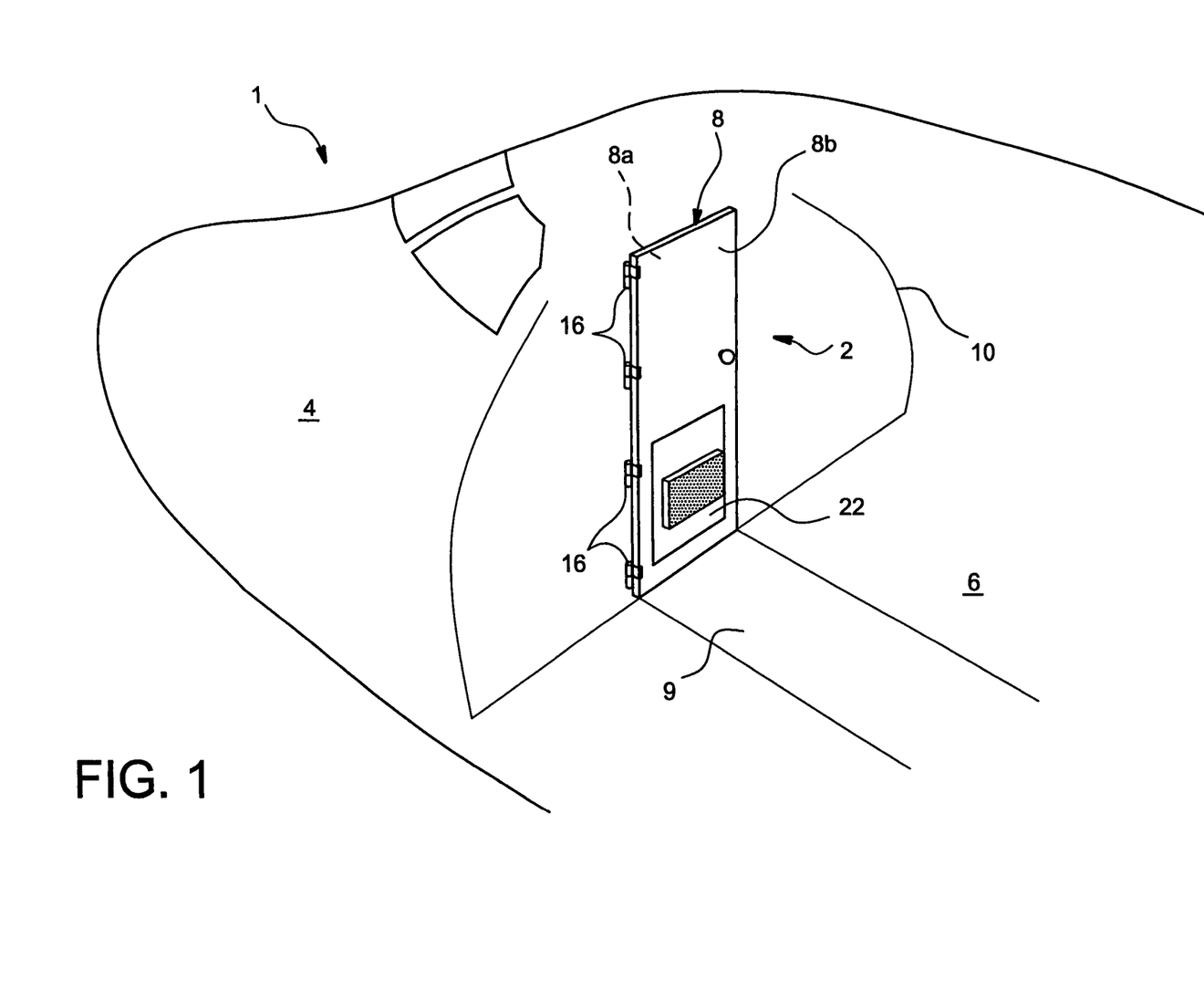
FIG. 1 shows a diagrammatic perspective view of a front part of an aircraft provided with a door system inserted between a cockpit and a cabin, the system comprising a door according to a preferred embodiment of this invention.

FIG. 1 shows a front part 1 of an aircraft provided with a door system 2 inserted between a cockpit 4 and a cabin 6, the door system 2 comprising a door 8 according to a preferred embodiment of this invention. Note that the door system 2 is arranged at a bulkhead 10 separating the cockpit 4 from the cabin 6, these two compartments being intended particularly to accommodate flight personnel in the cockpit, and aircraft passengers in the cabin.

The door 8, approximately in the shape of a parallelepiped and located perpendicular to a floor surface 9 of the aircraft, having a cockpit side 8a facing the cockpit 4 of the aircraft and a cabin side 8b facing the cabin 6 of the aircraft, when the door 8 is in a closed position like that shown in FIG. 1.

Figure 2:
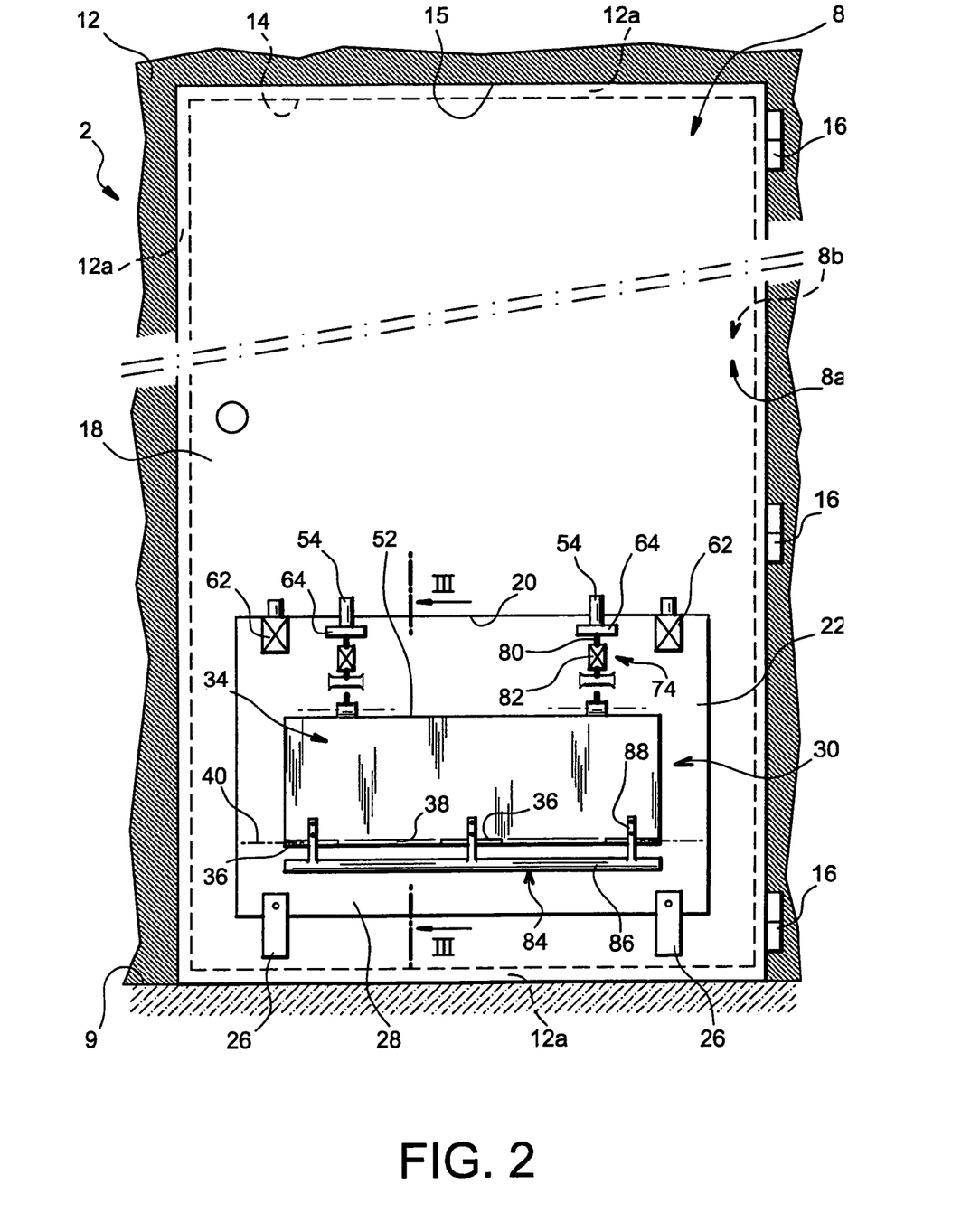
FIG. 2 shows a more detailed view of the door system in the front part of the aircraft represented in FIG. 1, seen from the cockpit of the aircraft.

As can be seen more precisely in FIG. 2, the door system 2 comprises the door 8 and a doorframe 12, the doorframe defining a passageway 14 communicating between the cockpit 4 and the cabin 6 of the aircraft. The door 8 is installed on the doorframe 12 through hinges 16 aligned along an axis (not shown) perpendicular to the floor surface 9. On the other hand, the hinges 16 are arranged on the cockpit side 8a of the door 8, so that they are not accessible from the cabin 6.

It is also specified that the doorframe 12 is provided with a stop surface 12a partially covering the cabin side 8b of the door 8 when it is in a closed position, in other words when it closes off the passageway 14 and it rests in a housing 15 provided in the doorframe 12, the housing 15 having a shape approximately complementary to the shape of the door 8. As can be seen in FIG. 2, the stop surface 12a is provided with a frame with a shape covering a peripheral portion of the cabin side 8b of the door 8. In this way, the resulting assembly does not create any gap between the door 8 and its associated doorframe 12, such that terrorists located in the aircraft cabin 6 cannot fire bullets between these two elements.

Thus, in this specific assembly configuration of the door 8 and the doorframe 12, the doorframe only allows opening of the door 8 towards the cockpit side 8a. Obviously, the door 8 according to the invention could be mounted on its associated doorframe 12 or in any other manner without going outside the scope of the invention.

Figure 3:
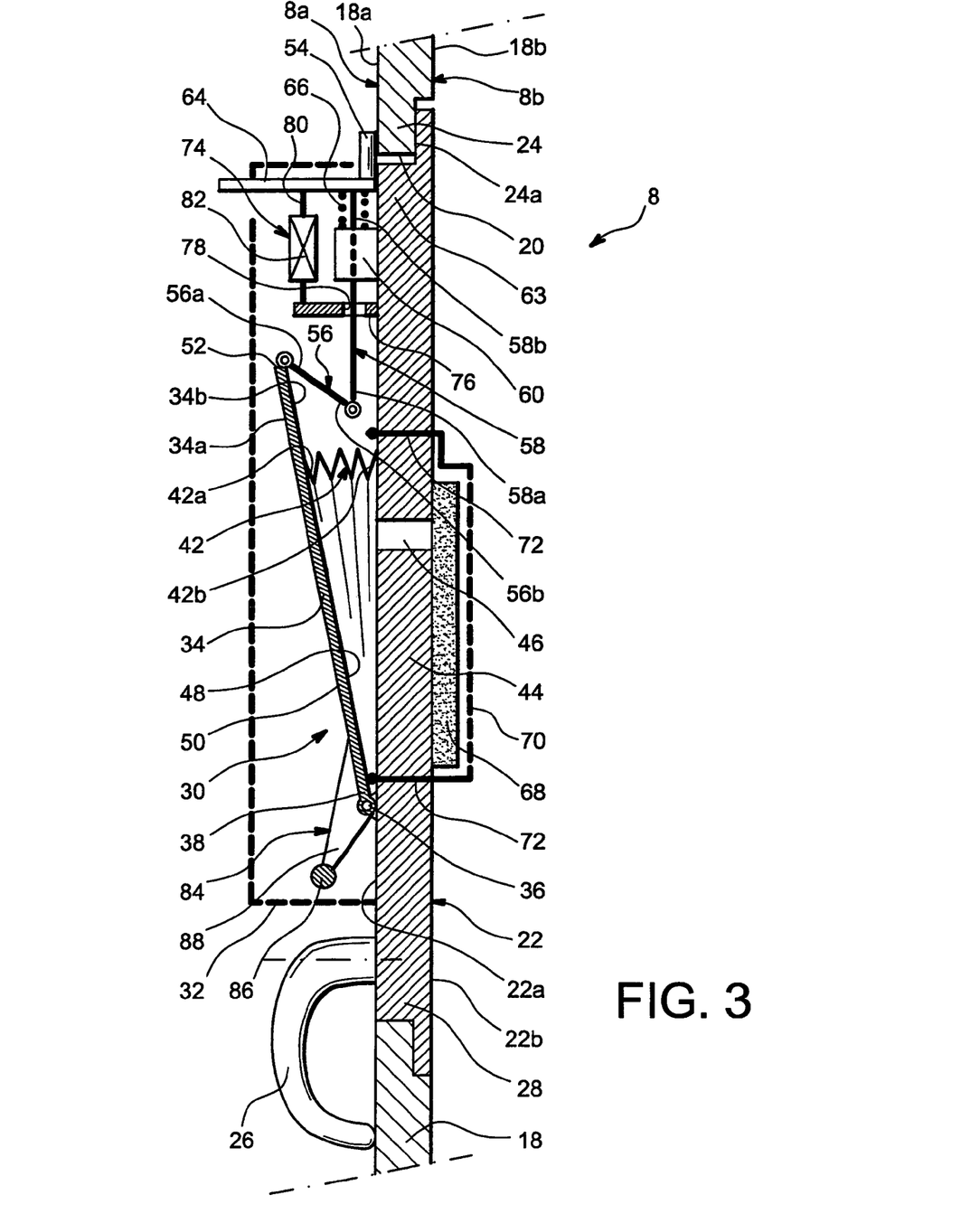
FIG. 3 shows a sectional view taken along line III-III in FIG. 2, when the trapdoor is locked in a position closing off the passageway passing through the door.

With reference to FIGS. 2 and 3, the door 8 comprises a main door body 18 provided with at least one through passageway 20, that enables communication between the cockpit 4 and the cabin 6. Furthermore, the door 8 comprises a trapdoor 22 capable of closing off the passageway 20, always such that there is no gap between the trapdoor 22 and a trapdoor frame 24, the trapdoor frame being provided in the main body of the door 18 and defining the passageway 20.

To facilitate understanding, it should be noted that the cockpit side 8a of the door 8 described above is composed of a cockpit side 18a of the main door body 18 and a cockpit side 22a of the trapdoor 22, the cockpit sides 18a and 22a obviously facing the cockpit 4 of the aircraft. At the same time, the cabin side 8b of the door 8 described above is composed of a cabin side 18b of the main door body 18 and a cabin side 22b of the trapdoor 22, the cabin sides 18b and 22b facing the cabin 6 of the aircraft.

The doorframe 24 has a stop surface 24a partially covering the cockpit side 22a of the trapdoor 22 when the trapdoor is in a position closing off the passageway 20 as shown in FIGS. 2 and 3. As can be seen in FIG. 3, the stop surface 24a is provided with a frame with a shape covering a peripheral portion of the cockpit side 22a of the trapdoor 22. In this way, the assembly made does not create any gap between the trapdoor 22 and its associated trapdoor frame 24, such that terrorists located in the aircraft cabin 6 cannot fire bullets between these two elements.

Note that to handle terrorist intrusion attempts inside the cockpit 4, the main door body 18 and the trapdoor 22 are made from a bullet-proof material such as glass fibre and Kevlar®. Furthermore, note that the doorframe 12 of the door system 2 can also be made from the same type of material, also in order to reinforce the security of flight personnel located in the cockpit 4 and to prevent intrusion of terrorists into this cockpit.

The trapdoor 22, preferably with an approximately parallelepiped shape, can be held locked in the passageway 20 particularly using pivot hooks 26 fixed to a lower part 28 of the trapdoor 22. The pivot hooks 26 are preferably aligned along an axis (not shown) parallel to the surface of the floor 9, and are preferably simply placed so as to bear in contact with the cockpit side 18a of the main door body 18. Thus, when the trapdoor 22 is unlocked, the hooks 26 enable this trapdoor 22 to be opened and to pivot towards the cabin side 8b of the door 8, in other words towards the cabin 6 of the aircraft. Furthermore, as mentioned above, since the pivot hooks 26 are preferably placed so as to be in contact with the cockpit side 18a of the door main body 18, the trapdoor 22 may be assembled and disassembled quickly without any tools.

The door 8 also comprises a locking/unlocking mechanism 30 in the trapdoor 22, this mechanism 30 being arranged on the cockpit side 8a of the door 8 so that it is not accessible from the cabin 6 of the aircraft. The mechanism 30 that can automatically unlock the trapdoor 22, is preferably installed entirely on the cockpit side 22a of the trapdoor 22, and is protected by a protection cover 32 (shown only in FIGS. 3 and 4) also assembled on the cockpit side 22a of the trapdoor 22. The cover 32 does not oppose equilibrium of pressures, and for example is in the form of a grill.

In the preferred embodiment described, the locking/unlocking mechanism 30 is of the pneumatic operation type and can automatically unlock the trapdoor 22 when the pressure difference between a cockpit pressure corresponding to the air pressure applied against the cockpit side 8a of the door 8 and a cabin pressure corresponding to the air pressure applied against the cabin side 8b of the same door 8, is greater than a predetermined value. In other words, when the pressure inside the cockpit 4 exceeds the pressure inside the cabin 6 by a predetermined value, for example less than 40 mbars, the trapdoor 22 is automatically unlocked and can be opened towards the cabin side 8b of the door 8.

To achieve this, once again with reference to FIGS. 2 and 3, the locking/unlocking mechanism 30 comprises a secondary trapdoor 34, preferably approximately parallelepiped in shape and having a first surface 34a and a second surface 34b opposite to each other. The secondary trapdoor 34 is assembled hinged onto the trapdoor 22, through hinges 36 fixed to a lower end 38 of the secondary trapdoor 34 and arranged along an axis 40 approximately parallel to the surface of the floor 9 and to the axis of the pivot hooks 26 of the trapdoor 22.

More specifically with reference to FIG. 3, the mechanism 30 comprises a membrane 42 defining a chamber, this membrane 42 preferably being a small forge bellows type. Furthermore, the membrane 42 has a first end 12a fixed to the second surface 34b of the secondary trapdoor 34, and a second end 42b fixed to a portion 44 of the trapdoor 22, provided with a plurality of through orifices 46.

In this way, a part 48 of the second surface 34b in contact with the chamber defined by the membrane 42, is subjected to cabin pressure due to the presence of orifices 46 on the portion 44 of the trapdoor 22. Similarly, a part 50 of the first surface 34a facing the part 48 of the second surface 34b, is subjected to the cockpit pressure. Thus, when different pressures are applied in contact with parts of surfaces 48 and 50 with approximately the same area, the force resulting from this pressure difference causes pivoting of the secondary trapdoor 34 about the axis 40.

To assure that the movement described by the secondary trapdoor 34 causes unlocking of the trapdoor 22, the locking/unlocking mechanism 30 also uses movement transmission means connected hinged firstly to an upper end 52 of the secondary trapdoor 34, and secondly fixed to at least one bolt 54. Preferably, the mechanism 30 comprises two bolts 54, each being designed to cooperate with the cockpit side 18a of the main door body 18, and more precisely with an upper part of the trapdoor frame 24 facing the cockpit 4 of the aircraft.

Still with reference more specifically to FIG. 3, on which the trapdoor 22 is shown in a locked position closing off the passageway 20, it can be seen that for each bolt 54 in the mechanism 30, the movement transmission means comprise a connecting rod 56 for which a first end 56a is connected hinged to the upper end 52 of the secondary trapdoor 34. Furthermore, the movement transmission means comprise a sliding transmission rod 58 fitted with a first end 58a, connected hinged to a second end 56b of the connecting rod 56. Therefore the transmission rod 58 is capable of describing a sliding movement through a guide bushing 60, installed fixed on the cockpit side 22a of the trapdoor 22. Thus, since the bolt 54 is connected fixed to a second end 58b of the transmission rod 58, it can be moved along the same sliding movement as the rod 58, this movement preferably being made along an axis approximately perpendicular to the surface of the floor 9 and the pivoting axis 40 of the secondary trapdoor 34. Note that the guide bushing 60 is preferably of the ball guide bushing type, that can provide good guidance for the transmission rod 58 and the bolt 54, and therefore does not require the addition of a guide slide for the bolt in which risks of seizure of the bolt are often very severe.

The locking/unlocking mechanism 30 is then designed so that when the cockpit pressure exceeds the cabin pressure by the predetermined value, preferably corresponding to a value causing significant depressurisation in the aircraft cabin 6, pivoting of the secondary trapdoor 34 about the axis 40 is sufficiently large to cause withdrawal of the bolts 54 from the trapdoor frame 24, following sliding of the transmission rod 58 towards the floor surface 9 of the aircraft. The trapdoor 22 of the door 8 is then unlocked.

Preferably, the predetermined value of the air pressure difference is sufficient to generate a force on an assembly composed of the trapdoor 22 and the locking/unlocking mechanism 30, to automatically open the unlocked trapdoor 22 towards the cabin side 8b of the door 8. On the other hand, note that this force must also be sufficient to cause opening of the trapdoor 22, even when it is coupled with retaining means 62. Part of the trapdoor 22 such as an upper end 63, may be provided with retaining means 62 (shown only in FIG. 2), such that inadvertent actuation of the mechanism 30 will not cause opening of the trapdoor 22. The retaining means 62 may be of the ball pusher type, capable of cooperating with the frame of the trapdoor 24 of the main door body 18.

Figure 4:
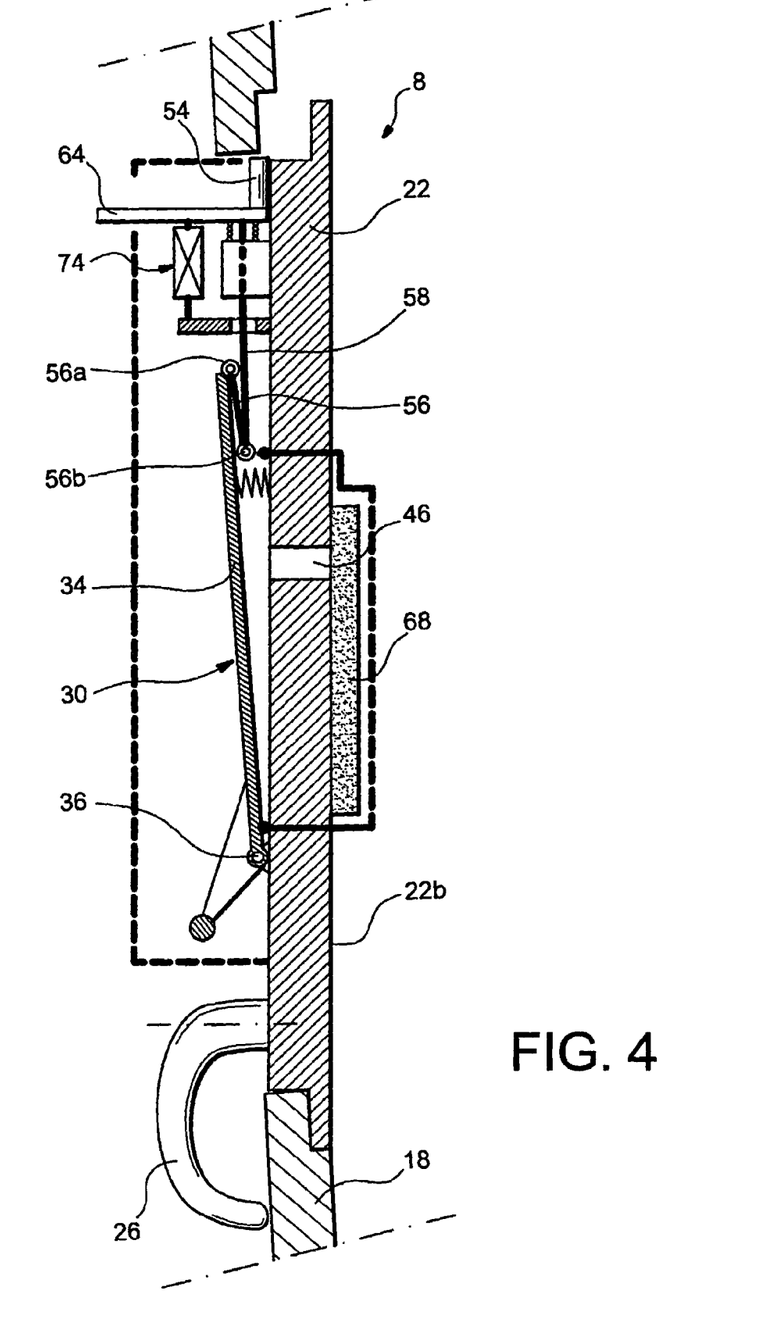
FIG. 4 shows a sectional view taken along line III-III in FIG. 2, when the trapdoor is unlocked and it is partially opened towards the cabin side of the door.

Furthermore, it would be possible for the pressure difference that caused the trapdoor 22 to be unlocked, to completely release the passageway 20 in less than 200 ms, after which an airflow could easily pass through this passageway 20 to provide venting between the cockpit 4 and the cabin 6 of the aircraft. In this respect, note that FIG. 4 shows the door 8 when it is in a closed position, and at the beginning of opening of the trapdoor 22 towards the cabin side 8b of the door 8.

Since the door 8 can be locked in a closed position throughout the duration of an aircraft flight, an accident of the aircraft could quickly cause blockage of flight personnel inside the cockpit 4. Thus, to prevent this type of blockage, it is preferable if the trapdoor 22 is unlocked manually from the cockpit 4. To achieve this, as can be seen in FIGS. 2 and 3, a lever 64 is inserted fixed between the transmission rod 58 and the bolt 54, for each bolt 54 in the mechanism 30. In this way, when each lever 64 is pushed downwards, namely towards the surface of the floor 9, each of the bolts 54 can release the trapdoor frame 24, and the trapdoor 22 can then be pushed so that it can be manually opened towards the cabin side 8b of the door 8. In this respect, note that the dimensions of the passageway 20 will be sufficiently large so that a person can pass through it to go from the cockpit 4 to the cabin 6 of the aircraft, if the door 8 is blocked in a closed position.

Obviously, the manual actuation levers 64 comprise a part extending on the outside to the protection cover 32, so that they are easily accessible to persons located inside the cockpit 4 of the aircraft. Furthermore, a return spring 66 for each bolt 54 is arranged between the lever 64 and the guide bushing 60.

The portion 44 of the trapdoor 22 provided with orifices 46 is covered by a filter 68, so as to arrange a door 8 and a door system 2 capable of resisting terrorist attempts to intrude into the cockpit 4. The filter 68 is arranged on the cabin side 22b of the trapdoor 22, and its main function is to conceal the location of these orifices 46, such that they cannot by seen by terrorists located in the cabin 6 of the aircraft. Furthermore, the filter 68 is hold in place against the cabin side 22b using a bullet-proof protection grill 70 capable of allowing air to pass through, assembled on the trapdoor 22 through a plurality of studs 72, passing through the same trapdoor 22 and being removable only from the cockpit side 22a of the trapdoor 22.

To prevent terrorists from causing unlocking of the trapdoor 22 by firing bullets or projecting a-mass in contact with this trapdoor 22, it is firstly possible for the movement transmission means for each bolt 54 to include anti-acceleration means 74. The anti-acceleration means 74 are arranged approximately parallel to the transmission rod 58, and are fixed firstly to the lever 64 and secondly to a support 76 installed fixed on the cockpit side 22a of the trapdoor 22. Note that instead of being fixed to the lever 64, the anti-acceleration means 74 could be fixed directly to the transmission rod 58, without going outside the scope of the invention.

Furthermore, as can be seen in FIG. 3, the support 76 is provided with a passageway orifice 78 through which the transmission rod 58 passes, so that it can describe its sliding movement with respect to the trapdoor 22. The anti-acceleration means 74 may for example comprise a hinge pin 80 capable of sliding and being blocked in a blocking body 82, and are then designed such that the hinge pin 80 stops in its associated blocking body 82 when the speed of the hinge pin 80 with respect to the body 80 exceeds a predetermined speed. Since the speed of the hinge pin 80 with respect to its associated blocking body 82 is identical to the speed of the transmission rod 58 with respect to the trapdoor 22, it can be deduced that the anti-acceleration means 74 are capable of stopping the movement of the transmission rod 58 when it follows a sliding movement with a speed greater than the predetermined speed.

Thus, when the locking/unlocking mechanism 30 is actuated following a fast movement of the secondary trapdoor 34 resulting from the impact of bullets or a mass in contact with the door 8, the movement of constituents of this mechanism 30 is automatically stopped such that the bolts 54 do not release the trapdoor frame 24.

Figure 5:
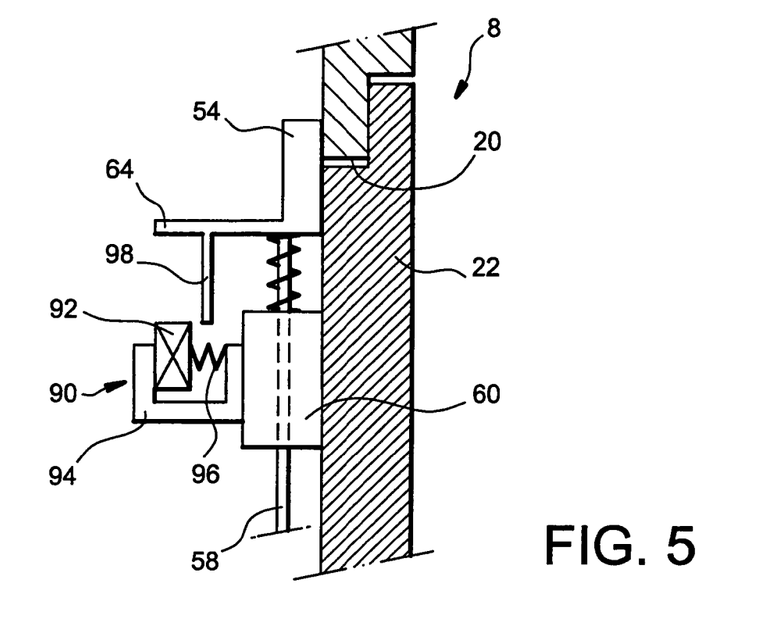
FIG. 5 shows a partial sectional view of a door according to another preferred embodiment of this invention when the trapdoor is unlocked in a position closing off the passageway passing through the door.
Figure 6:
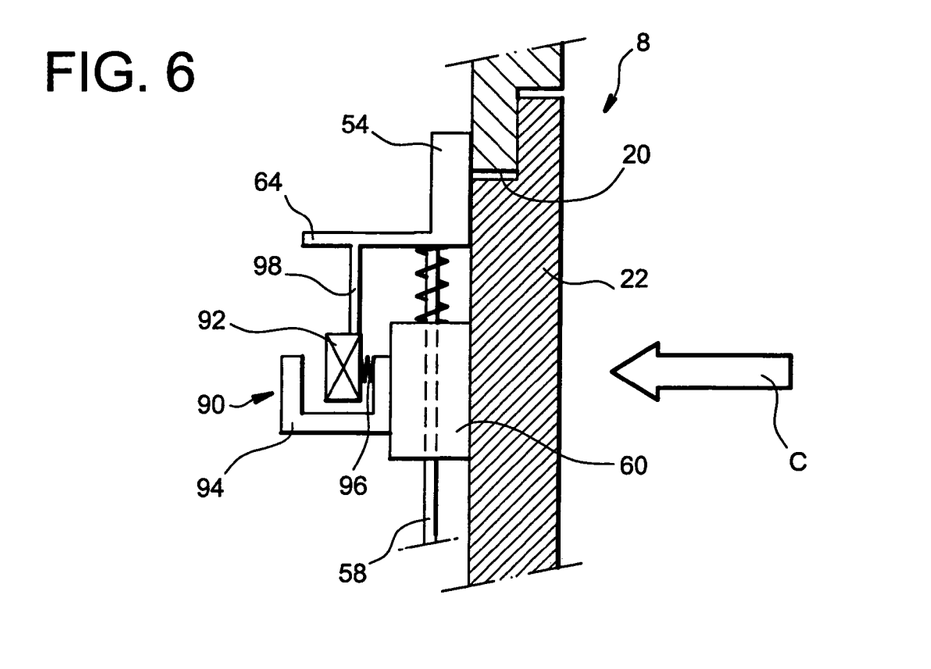
FIG. 6 shows a view similar to the view in FIG. 5, when the trapdoor is locked in a position closing off the passageway passing through the door and a shock is applied on this door.

According to another preferred embodiment of the invention and with reference to FIGS. 5 and 6, the movement transmission means for each bolt 54 may include stop means 90, once again to prevent terrorists from unlocking the trapdoor 22 by firing bullets or projecting a mass in contact with the door 8. These stop means 90 include firstly an inertial mass 92 capable of sliding along an axis approximately perpendicular to the plane of the door 8, inside a support 94 preferably fixed to the guide bushing 60 as shown, or fixed to the trapdoor 22 directly.

When the trapdoor 22 is locked in a position closing off the passageway 20 as shown in FIG. 5, a spring 96 fixed to the support 94 keeps the inertial mass 92 in a withdrawn position, in which this mass 92 is in contact with an inside surface of the support 94 on the cockpit side of this support. Note that the support 94 is designed such that in this withdrawn position, the inertial mass 92 is sufficiently far from the trapdoor 22 such that a stop device 98 fixed to the lever 64 and therefore to the bolt 54, does not come into contact with the inertial mass 92 during a movement of this bolt 54. In other words, the inertial mass 92 occupying its withdrawn position makes the stop means 90 inoperative, such that the movement transmission means can operate in the same way as they would if these stop means 90 did not exist.

On the other hand, when a shock with a predetermined intensity occurs on the door 8 as shown diagrammatically by the arrow C in FIG. 6, the inertial mass 92 then automatically slides towards the trapdoor 22 towards the cabin side of the support 94 under the effect of an acceleration caused by the shock, so as to occupy a stop position in which the mass 92 forms a stop for the stop device 98. Note for example that this stop device 98 may be in the form of a pin extending from the lever 64, towards the floor surface 9 of the aircraft.

In this way, when the lower part of the stop device 98 is in contact with the inertial mass 92, the result is blockage of the set of movement transmission means and therefore the bolt 54, such that the trapdoor 22 cannot be unlocked.

Obviously, the stop means 90 are designed such that the inertial mass 92 occupies its stop position only when the intensity of the shock applied on the door 8 is greater than or equal to a predetermined intensity, which can be chosen so as to translate the impact of bullets or a mass.

Furthermore, in order to further reduce the risks of the trapdoor 22 being unlocked as a result of the impact of bullet's or a mass in contact with the door 8, it can integrate a balancing system 84 of the secondary trapdoor 34 that can be seen in FIGS. 2 and 3. The balancing system 84 is designed so as to prevent or severely limit the movement of the secondary trapdoor 34 following a shock occurring on the door 8, or more specifically on the trapdoor 22. The balancing system 84 then includes a balancing mass 84, preferably in the form of a bar extending parallel to the pivot axis 40 of the trapdoor 22, and arms 88 forming the connection between the balancing mass 86 and the lower end 38 of the secondary trapdoor 34.

Therefore the balancing device 84 is designed so that it can balance the driving moment applied by the secondary trapdoor 34, under the acceleration applied by the shock that occurs on the door 8.

Obviously, those skilled in the art could make various modifications to the door 8 and to the door system 2 that have been described above simply as non-limitative examples.

The invention claimed is:

1. Door designed to be inserted between a cockpit and a cabin of an aircraft, said door having a cockpit side and a cabin side, characterised in that it comprises at least one trapdoor capable of firstly closing off a passageway provided through said door and secondly of opening towards the cabin side of this door, the door also comprising a mechanism for locking/unlocking of the trapdoor at least one arranged on the cockpit side of the door and capable of automatically unlocking the trapdoor at least one when the difference between a cockpit pressure corresponding to the air pressure applied against the cockpit side of said door and a cabin pressure corresponding to the air pressure applied against the cabin side of said door, is greater than a predetermined value, characterised in that the locking/unlocking mechanism is mounted on the trapdoor at least one of the door, the locking/unlocking mechanism comprising:

a secondary trapdoor comprising a first surface and a second surface, the first surface being subject to the cockpit pressure, a membrane defining a chamber and being provided with a first end and a second end, the first end being fixed to the second surface of the secondary trapdoor, and the second end being fixed to a portion of the trapdoor at least one provided with at least one through orifice, at least a part of the second surface of the secondary trapdoor subjected to cabin pressure, and means of transmission of movement connected firstly to the secondary trapdoor capable of moving when the cockpit pressure and the cabin pressure are different, and secondly to at least one bolt that cooperates with a trapdoor frame provided on the door and defining said passageway, the secondary trapdoor comprising an upper end and a lower end, the lower end being connectedly hinged onto the trapdoor and the upper end being connectedly hinged to the movement transmission means.

2. Door according to claim 1, characterised in that said predetermined value of the air pressure difference is such that it can generate a sufficient force on the trapdoor at least one to cause automatic opening of the unlocked trapdoor towards the cabin side of said door.

3. Door according to claim 1, characterised in that the movement transmission means for each bolt in the locking/unlocking mechanism includes:
a connecting rod, provided with a first end and a second end, the first end being connectedly hinged to the upper end of the secondary trapdoor, and
a sliding transmission rod provided with a first end and a second end, the first end being connectedly hinged to the second end of said connecting rod, and the second end being connectedly fixed to said bolt.

4. Door according to claim 3, characterised in that for each bolt in the locking/unlocking mechanism, the movement transmission means also comprise a guide bushing fixed to the trapdoor in said door, and inside which the transmission rod is free to slide.

5. Door according to claim 4, characterised in that each bolt in the locking/unlocking mechanism is fixed to a lever that can be actuated in order to release said trapdoor manually, a return spring of the bolt being arranged between said lever and the guide bushing of the movement transmission means.

6. Door according to claim 1, characterised in that the movement transmission means for said at least one bolt in the locking/unlocking mechanism also include anti-acceleration means designed to stop the movement of a transmission rod when the transmission rod is moving at a speed greater than a predetermined speed.

7. Door according to claim 1, characterised in that for each bolt in the locking/unlocking mechanism, the movement transmission means also comprise stop means provided with an inertial mass that can move automatically from a withdrawn position to a stop position, following a shock that occurs on the door with an intensity greater than or equal to a predetermined intensity, so as to form a stop for a stop device fixed to said bolt.

8. Door according to claim 1, characterised in that the locking/unlocking mechanism also includes a balancing system for the secondary trapdoor, said balancing system being designed to prevent any movement of the secondary trapdoor that could cause unlocking of this trapdoor following a shock applied on said door.

9. Door according to claim 1, characterised in that the locking/unlocking mechanism is protected by a protection cover installed on the cockpit side on the trapdoor in said door.

10. Door according to claim 1, characterised in that said the portion of the trapdoor provided with at least one through orifice is covered by a filter arranged on the cabin side of said door and concealing the location of each orifice, said filter being held in contact with the trapdoor by a bullet-proof protection grill assembled on said trapdoor.

11. Door according to claim 10, characterised in that the bullet-proof protection grill is assembled on the trapdoor using a plurality of studs passing through said trapdoor, and that can only be disassembled from the cockpit side of said door.

12. Door according to claim 1, characterised in that the trapdoor comprises a lower part provided with pivot hooks designed firstly to hold the trapdoor in a passageway closing position when it is locked, and secondly to enable pivoting of said trapdoor towards the cabin side when it is unlocked.

13. Door according to claim 1, characterised in that the trapdoor comprises an upper part provided with means of retaining said trapdoor in the passageway.

14. Door according to claim 1, characterised in that it comprises a main door body and the trapdoor at least one that can be mounted on the main door body in order to close off said passageway, the trapdoor at least one fitted with the locking/unlocking mechanism being fully removable from the main door body.

15. Door according to claim 14, characterised in that the main door body and the trapdoor are made from a bullet-proof material.

16. Door according to claim 1, characterised in that the passageway is sufficiently large to enable evacuation of personnel through said passageway.

17. Door system designed to be inserted between a cockpit and a cabin of an aircraft, said system comprising a doorframe and a door with a cockpit side and a cabin side, the doorframe being capable of partially covering the cabin side of said door and preventing this door from being opened in any direction except towards the cockpit side, characterised in that said door is a door according to claim 1.

18. Door designed to be inserted between a cockpit and a cabin of an aircraft, said door having a cockpit side and a cabin side, the door comprising:
at least one trapdoor capable of firstly closing off a passageway provided through said door and secondly of opening towards the cabin side, the trapdoor at least one includes a locking/unlocking mechanism arranged on the cockpit side and capable of automatically unlocking the trapdoor at least one when a difference between a cockpit pressure corresponding to the air pressure applied against the cockpit side of said door and a cabin pressure corresponding to the air pressure applied against the cabin side is greater than a predetermined value, the locking/unlocking mechanism mounted on the trapdoor at least one and including:
a secondary trapdoor comprising a first surface and a second surface, the first surface being subject to the cockpit pressure;
a membrane defining a chamber and being provided with a first end and a second end, the first end being fixed to the second surface of the secondary trapdoor, and the second end being fixed to a portion of the trapdoor at least one provided with at least one through orifice, wherein at least a part of the second surface of the secondary trapdoor is subjected to cabin pressure; and
a transmission element coupled to the secondary trapdoor, wherein the transmission element is capable of being moved when the cockpit pressure and the cabin pressure are different, the transmission element coupled to at least one bolt that cooperates with a trapdoor frame provided on the door and defining said passageway, the locking/unlocking mechanism including an anti-acceleration element configured to stop the movement of a transmission rod when the transmission rod is moving at a speed greater than a predetermined speed.

19. Door designed to be inserted between a cockpit and a cabin of an aircraft, said door having a cockpit side and a cabin side, the door comprising:
at least one trapdoor capable of firstly closing off a passageway provided through said door and secondly of opening towards the cabin side, the trapdoor at least one includes a locking/unlocking mechanism arranged on the cockpit side and capable of automatically unlocking the trapdoor at least one when a difference between a cockpit pressure corresponding to the air pressure applied against the cockpit side of said door and a cabin pressure corresponding to the air pressure applied against the cabin side is greater than a predetermined value, the locking/unlocking mechanism mounted on the trapdoor at least one and including:
a secondary trapdoor comprising a first surface and a second surface, the first surface being subject to the cockpit pressure;
a membrane defining a chamber and being provided with a first end and a second end, the first end being fixed to the second surface of the secondary trapdoor, and the second end being fixed to a portion of the trapdoor at least one provided with at least one through orifice, wherein at least a part of the second surface of the secondary trapdoor is subjected to cabin pressure, the portion of the trapdoor at least one covered by a filter arranged on the cabin side of said door and concealing the location of each orifice, said filter being held in contact with the trapdoor at least one by a bullet-proof protection grill assembled on said trapdoor at least one; and
a transmission element coupled to the secondary trapdoor, wherein the transmission element is capable of being moved when the cockpit pressure and the cabin pressure are different, the transmission element coupled to at least one bolt that cooperates with a trapdoor frame provided on the door and defining said passageway.

20. Door designed to be inserted between a cockpit and a cabin of an aircraft, said door having a cockpit side and a cabin side, the door comprising:
at least one trapdoor capable of firstly closing off a passageway provided through said door and secondly of opening towards the cabin side, the trapdoor includes a locking/unlocking mechanism arranged on the cockpit side and capable of automatically unlocking the trapdoor at least one when a difference between a cockpit pressure corresponding to the air pressure applied against the cockpit side of said door and a cabin pressure corresponding to the air pressure applied against the cabin side is greater than a predetermined value, the locking/unlocking mechanism mounted on the trapdoor at least one and including:
a secondary trapdoor comprising a first surface and a second surface, the first surface being subject to the cockpit pressure,
a balancing system for the secondary trapdoor configured to prevent any movement of the secondary trapdoor to avoid unlocking of the trapdoor following an external shock applied to said door;
a membrane defining a chamber and being provided with a first end and a second end, the first end being fixed to the second surface of the secondary trapdoor, and the second end being fixed to a portion of the trapdoor at least one provided with at least one through orifice, wherein at least a part of the second surface of the secondary trapdoor is subjected to cabin pressure; and
a transmission element coupled to the secondary trapdoor, wherein the transmission element is capable of being moved when the cockpit pressure and the cabin pressure are different, the transmission element coupled to at least one bolt that cooperates with a trapdoor frame provided on the door and defining said passageway.

21. Door designed to be inserted between a cockpit and a cabin of an aircraft, said door having a cockpit side and a cabin side, the door comprising:
at least one trapdoor capable of firstly closing off a passageway provided through said door and secondly of opening towards the cabin side, the trapdoor includes a locking/unlocking mechanism arranged on the cockpit side and capable of automatically unlocking the trapdoor at least one when a difference between a cockpit pressure corresponding to the air pressure applied against the cockpit side of said door and a cabin pressure corresponding to the air pressure applied against the cabin side is greater than a predetermined value, the locking/unlocking mechanism mounted on the trapdoor at least one and including:
a secondary trapdoor comprising a first surface and a second surface, the first surface being subject to the cockpit pressure,
a membrane defining a chamber and being provided with a first end and a second end, the first end being fixed to the second surface of the secondary trapdoor, and the second end being fixed to a portion of the trapdoor at least one provided with at least one through orifice, wherein at least a part of the second surface of the secondary trapdoor is subjected to cabin pressure; and
a transmission element coupled to the secondary trapdoor, wherein the transmission element is capable of being moved when the cockpit pressure and the cabin pressure are different, the transmission element coupled to at least one bolt that cooperates with a trapdoor frame provided on the door and defining said passageway, the transmission element including a stop element having an inertial mass configured to automatically move from a withdrawn position to a stop position following a shock that occurs on the door with an intensity greater than or equal to a predetermined intensity.

* * * * *